June 23, 1953
L. L. CUMMINGS
2,642,889
GAS LIFT VALVE
Filed March 19, 1951
4 Sheets-Sheet 1
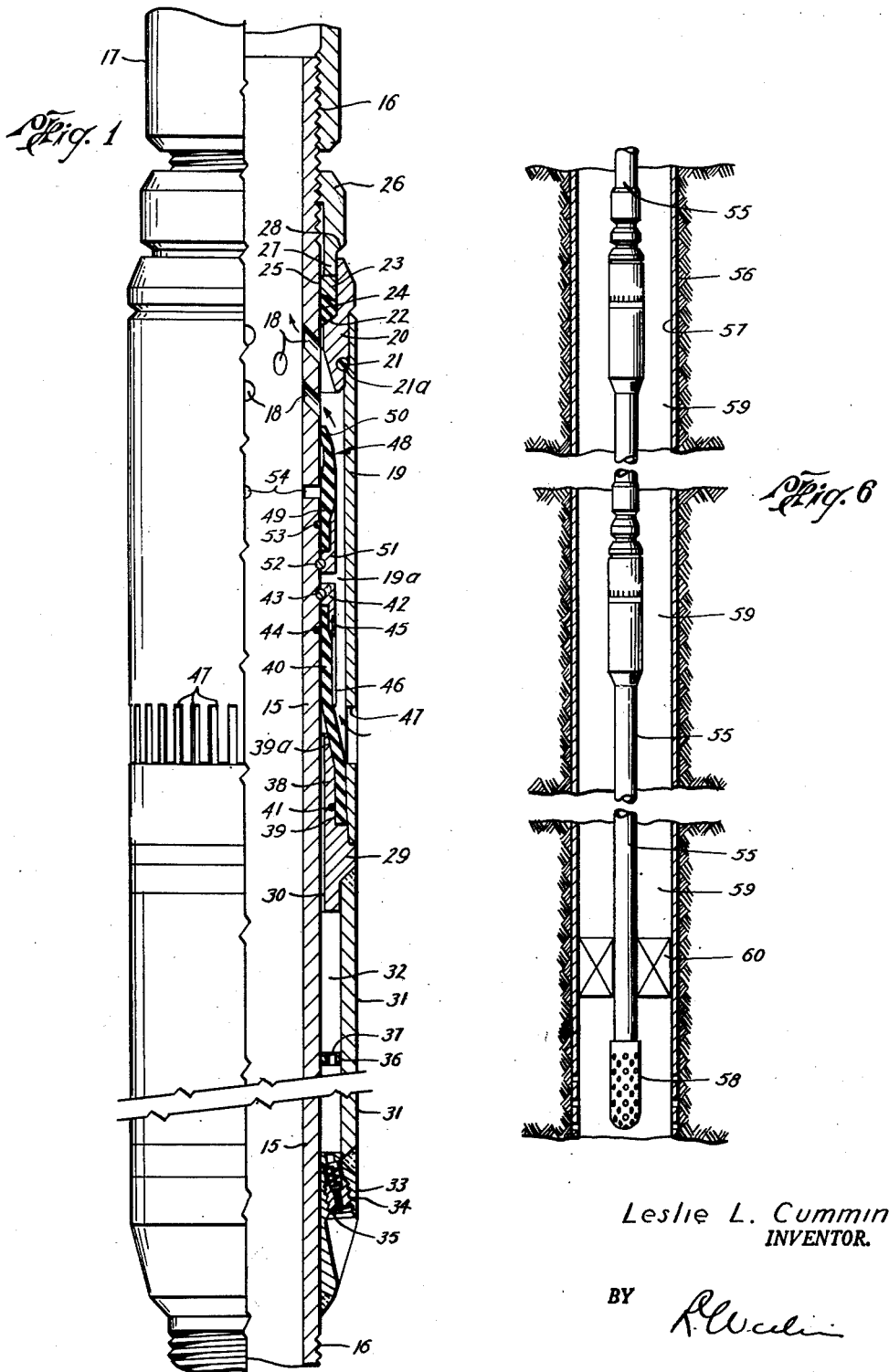
Leslie L. Cummings
INVENTOR.
BY
ATTORNEY June 23, 1953 — L. L. CUMMINGS — 2,642,889
GAS LIFT VALVE
Filed March 19, 1951 — 4 Sheets-Sheet 2
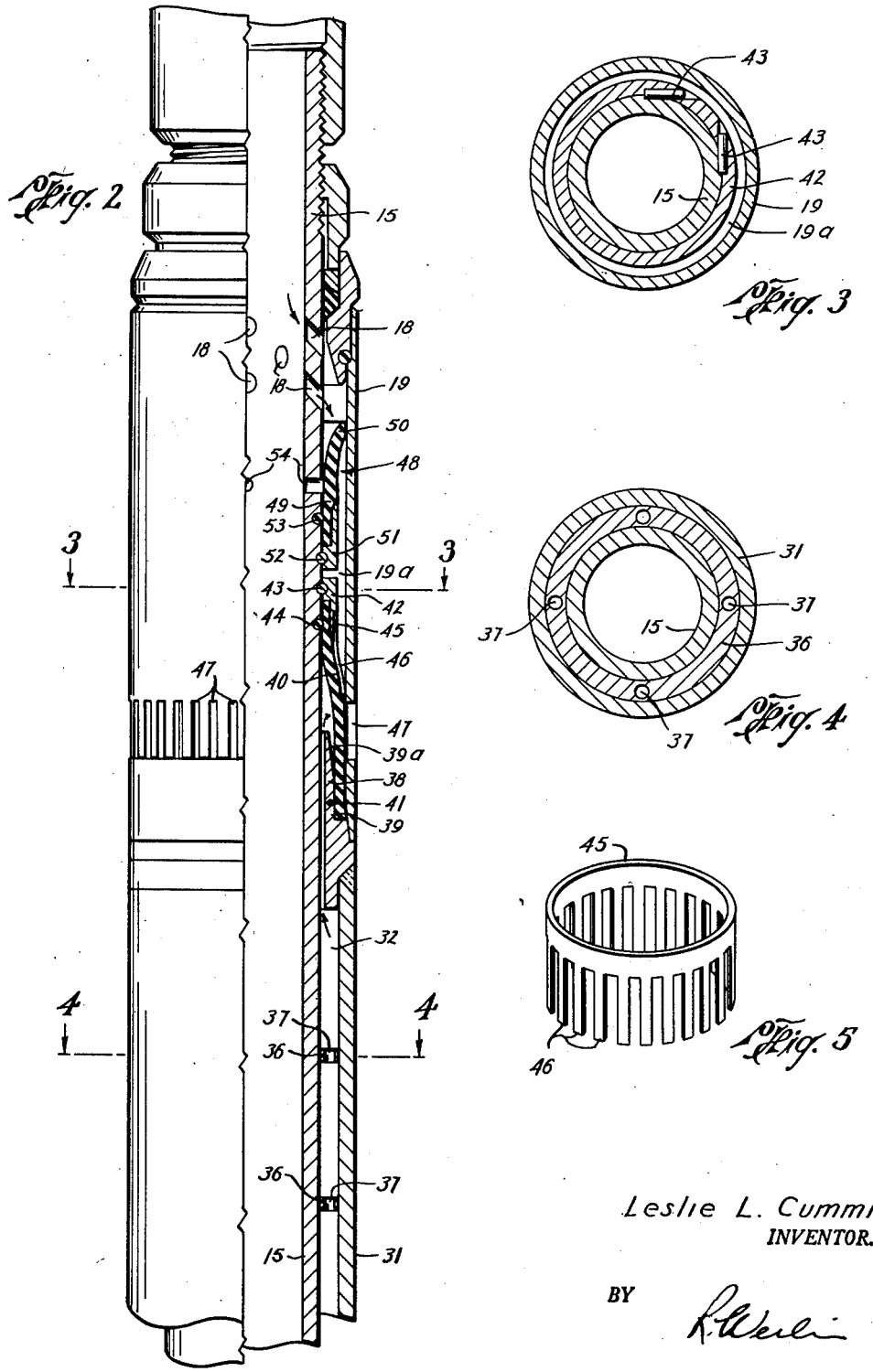
Leslie L. Cummings
INVENTOR.
BY
ATTORNEY June 23, 1953
L. L. CUMMINGS
2,642,889
GAS LIFT VALVE
Filed March 19, 1951
4 Sheets-Sheet 3
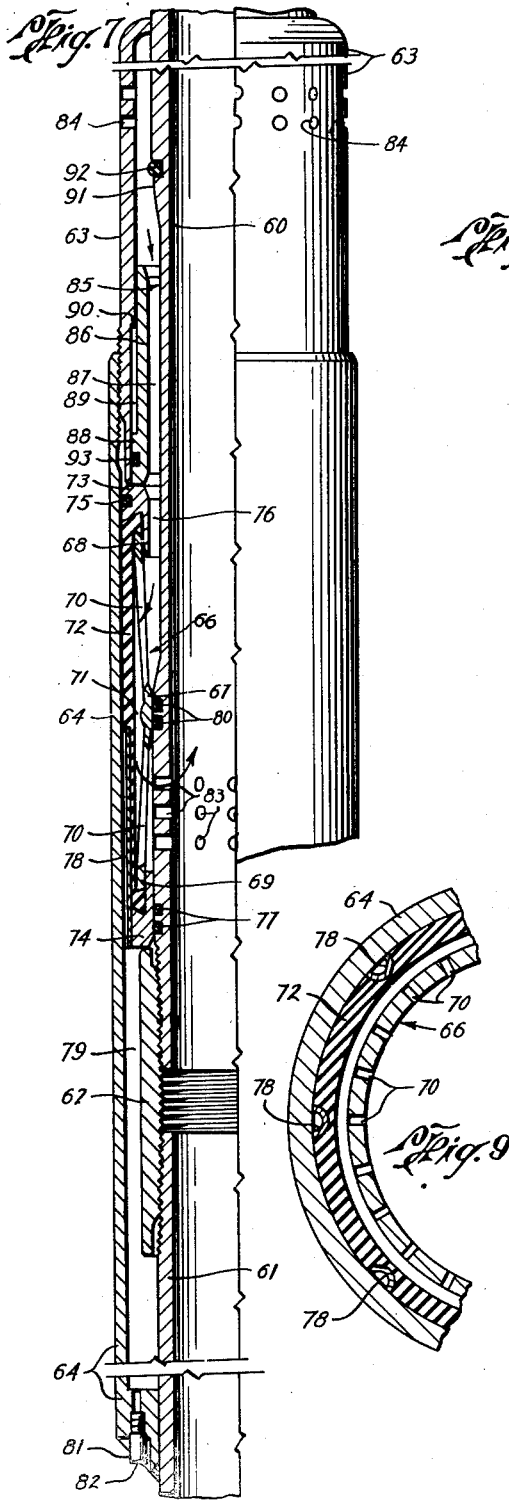
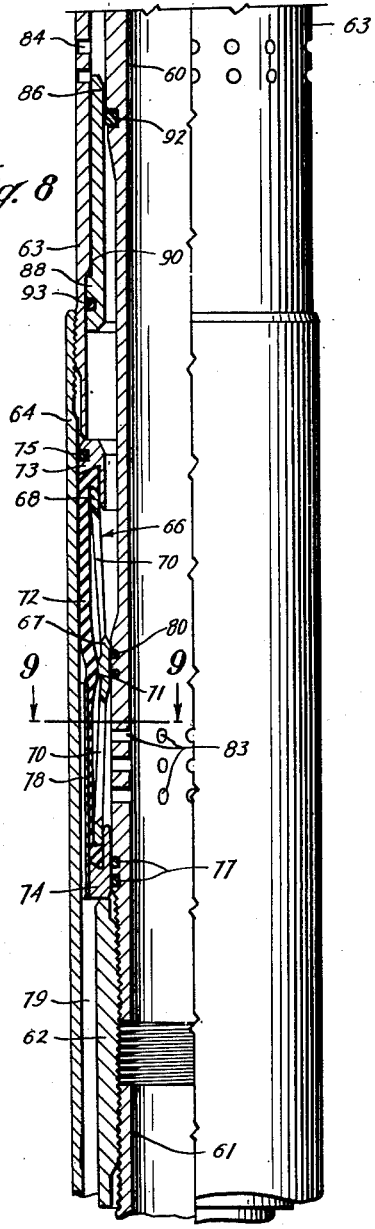
Leslie L. Cummings
INVENTOR.
BY
ATTORNEY June 23, 1953 — L. L. CUMMINGS — 2,642,889
GAS LIFT VALVE
Filed March 19, 1951 — 4 Sheets-Sheet 4
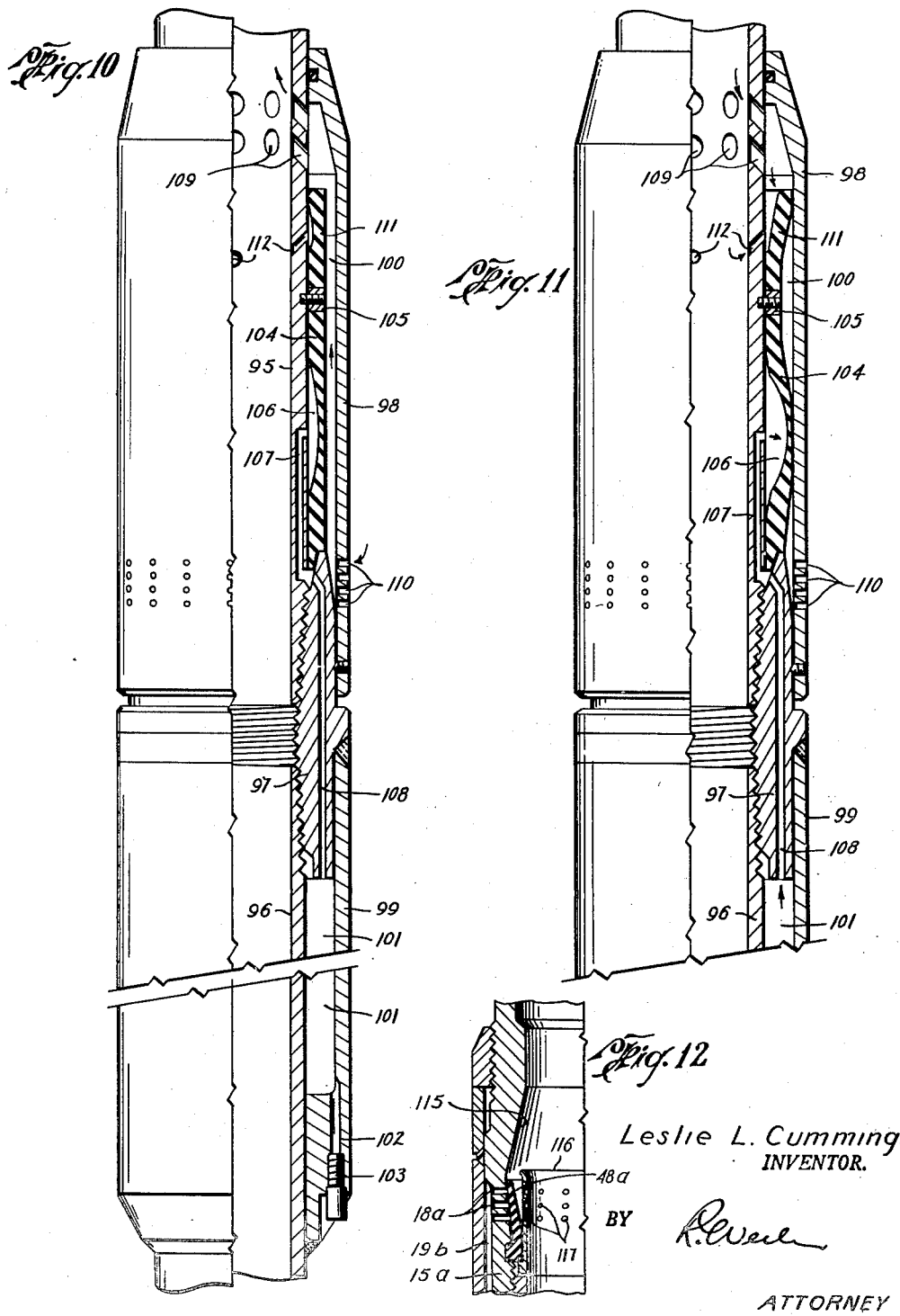
Leslie L. Cummings
INVENTOR.
BY
ATTORNEY Patented June 23, 1953

2,642,889

UNITED STATES PATENT OFFICE 2,642,889

GAS LIFT VALVE

Leslie L. Cummings, Houston, Tex., assignor to Cummings, Inc., Houston, Tex., a corporation of Texas Application March 19, 1951, Serial No. 216,381

7 Claims. (Cl. 137—155)

This invention relates to valves for use in oil wells and the like for controlling the admission of gas or air into a column of fluid in the well to lift the column and aid in flowing the fluid from the well. Such valves are commonly referred to in the art as air-or-gas-lift valves.

In conventional gas lift systems, the well equipment includes a string of relatively small pipe, called the "tubing," which is inserted inside a larger diameter string of pipe, called the "casing." Gas or air is introduced under controlled pressures and volumes into the annular space between the tubing and casing and is injected through suitable gas-lift valves, located at spaced points along the tubing, into the column of oil inside the tubing in order to lift the oil to the surface. Conventional types of injection or gas-lift valves, which are commonly employed for controlling the admission of the lifting gas into the tubing from the annular space, comprise relatively complicated valve structures which are enclosed in suitable housings which, by reason of their construction, must always be mounted at the side of the tubing string and communicate with the interior of the tubing through suitable ports in the wall thereof.

Such conventional gas-lift valves always include a circular valve seat having a central bore or orifice through which the lifting gas passes from the annular space into the valve housing and then into the tubing. A valve disk or plug is arranged to cooperate with the seat to open and close the bore thereof for regulating and controlling the passage of gas therethrough. The movements of the disk or plug are ordinarily controlled by suitable loading mechanism, such as coil springs, or a flexible bellows, or both, which are adapted to provide the necessary loading on the valve disk to control the pressures at which opening and closing of the valve will take place.

Conventional gas-lift valves of the general type described are subject to numerous disadvantages. They are necessarily relatively complicated in construction, requiring a relatively large number of parts, including moving parts. The valve and seat members are subject to a high degree of erosion and cutting out due to the necessarily high velocities of the gas passing through the valve, particularly at the initial opening and final closing stages. As a result, conventional valves and seats are made of metal and require highly finished, specially hardened seating surfaces. The bellows and springs are subject to fatigue or other failures and, under the usual operating conditions, provide only relatively small forces for operating the valve.

More importantly, the space limitations inherently imposed by the ordinarily relatively narrow annular space between the casing and tubing into which the valve mechanism must be inserted, since it is mounted at the side of the tubing, necessarily restrict the maximum dimensions of the valve, especially of the diameter of the valve seat orifice, thereby greatly limiting the orifice area of the valve and consequently the rate of flow of lifting gas into the tubing.

Moreover, present valves are all subject, in greater or lesser degree, to the undesirable effect of back pressure of the column of fluid in the tubing acting on the surfaces of the valve closure necessarily exposed thereto.

The primary object of the present invention is to provide a gas lift valve construction which will eliminate or greatly obviate the several disadvantages inherent in existing types of gas-lift valves.

A principal object of this invention is to provide a valve structure which is concentric with the tubing string to which it is connected.

An important object is to provide a valve structure which includes a tubular valve closure constructed of flexible resilient material which concentrically surrounds the tubing and is radially contractible and expansible for controlling gas admission ports in the tubing.

Another important object is to provide a valve structure having a gas admission port area very much larger than in any existing type of gas lift valve.

A further object is the provision of a valve structure in which the closure elements have no metal-to-metal engaging surfaces.

An additional object is the provision of a valve structure having a tubular closure element for opening and closing the gas admission port to the tubing and an auxiliary check valve means of tubular form adapted to prevent back-flow of fluid from the tubing, both the closure element and the check valve means being constructed of resilient, flexible composition material.

Another object is the provision of a gas-lift valve which is not subject to the back-pressure effect of the column of fluid in the tubing.

Other and more specific objects and advantages of this invention will be readily apparent from the following detailed description when read in conjunction with the accompanying drawings which illustrate several useful embodiments in accordance with this invention.

In the drawings:

Fig. 1 is a longitudinal, partly sectional, view of a valve structure in accordance with one embodiment of this invention wherein the valve elements are shown in their fully open position;

Fig. 2 is a view similar to Fig. 1 showing the valve elements in their fully closed positions;

Figs. 3 and 4 are cross-sectional views taken along lines 3—3 and 4—4, respectively, of Fig. 2;

Fig. 5 is a perspective view of one of the valve elements;

Fig. 6 is a generally diagrammatic view of a portion of a well showing a plurality of the valves installed in a tubing string;

Fig. 7 is a longitudinal, partly sectional view of another embodiment of the valve in accordance with this invention, the valve elements being shown in their fully open position;

Fig. 8 is a view similar to Fig. 7 showing the valve elements in their fully closed positions;

Fig. 9 is an enlarged partial cross-sectional view along line 9—9 of Fig. 8;

Fig. 10 is a longitudinal, partly sectional, view of still another embodiment of the valve in accordance with this invention, the valve elements being shown in their fully open positions;

Fig. 11 is a view similar to Fig. 10 showing the valve elements in their fully closed position; and Fig. 12 is a detail showing a modified form of check valve which may be employed in the valve structures in accordance with this invention.

Referring first to Figs. 1 to 5, inclusive, the valve structure therein illustrated, comprises a tubular body 15, normally having the same dimensions as the tubing string into which it is to be inserted. The upper and lower ends of the body are provided with externally threaded sections 16—16 by means of which the body may be co-axially connected into adjacent sections of a string of well tubing, as by means of conventional screw collars 17 (only one shown). Adjacent one end thereof, body 15 is provided with a plurality of ports 18, extending through the wall thereof and spaced about its circumference and forming the gas-admission passageways to the tubing string. A tubular housing 19 of somewhat larger diameter than body 15 is concentrically arranged about the exterior of the body to define an annular space between the body and the housing forming a valve chamber 19a for enclosing the valve mechanism to be subsequently described. Ports 18 are termed the outlet ports for valve chamber 19a. The upper end of housing 19 extends along body 15 to a point somewhat past ports 18 and valve chamber 19a between body 15 and housing 19 is closed at its upper end by means of a tubular bushing 20 which surrounds body 15 and extends into the upper end of chamber 19a. A resilient packing ring 21, preferably of the conventional O-ring type, is arranged between the outer wall of bushing 20 and an annular seat 21a arranged in the adjacent wall of housing 19 to form a fluid-tight seal between these surfaces. Bushing 20 is provided with an internal upwardly facing shoulder 22 forming an annular stuffing box 23 surrounding body 15. A conventional circular packing 24 is installed in stuffing box 23 and a metallic compression ring 25 is seated in the stuffing box on top of packing 24. A tubular gland nut 26, adapted to screw down over threads 16, has a portion 27 adapted to project into the stuffing box into engagement with compression ring 25 to apply compressive force thereto to compress packing 24 to thereby form a fluid-tight seal between body 15 and the inner surface of bushing 20. Gland nut 26 is provided with an external downwardly facing shoulder 28 which is adapted to engage the upper end of bushing 20 when the gland nut is screwed down into the stuffing box to thereby lock the bushing in place in the end of housing 19.

The opposite or lower end of valve chamber 19a is closed by means of a closure ring 29 which may be welded or otherwise rigidly connected to housing 19. The inner diameter of closure ring 29 is made somewhat larger than the external diameter of body 15 forming an annular passageway 30 therebetween communicating with the lower end of valve chamber 19a. A second tubular sleeve 31 surrounds body 15 below ring 29 and preferably, although not necessarily, has the same external diameter as housing 19. Sleeve 31 defines an annular chamber 32 about the exterior of body 15 below ring 29 communicating with the lower end of passageway 30. The lower end of chamber 32 is closed by means of a metal closure ring 33 which may be welded or otherwise rigidly connected to body 15 and housing sleeve 31. A filler opening 34 extends through closure ring 33 and is fitted with a pneumatic inwardly-opening check valve 35 to permit introduction of pneumatic pressure fluid into chamber 32 while automatically preventing escape of such fluid from the chamber. A plurality of axially spaced reinforcing rings 36 may be installed in chamber 32 between body 15 and sleeve 31, and are provided with a plurality of passageways 37 (see Figs. 2 and 4) to permit movement of pneumatic fluid through chamber 31.

The upper end of ring 29 is provided with an upwardly extending boss 38 of reduced external diameter forming an annular seat 39 between the exterior of boss 38 and the adjacent portion of the inner wall of housing 19. A tubular sleeve valve 40, constructed of flexible resilient material, such as rubber or the like, is co-axially disposed in valve chamber 19a surrounding a portion of body 15. Sleeve valve 40 has a wall thickness generally less than the width of chamber 19a. One end of sleeve valve 40 is disposed in seat 39 and is tightly clamped therein between the outer surface of boss 39 and housing 19, thus forming a fluid-tight seal with the inner wall of housing. A resilient packing ring 41, such as a conventional O-ring, is mounted in the outer face of boss 39 in sealing engagement with the adjacent surface of the end of sleeve valve 40. The upper end portion of the outer surface of boss 39 is preferably provided with an upwardly and inwardly tapered portion 39a. The opposite end of sleeve valve 40 is clamped tightly to the exterior of body 15 by means of annular metal fitting 42 which is locked to body 15 by any suitable means, such as a tangential locking pin 43 (see Fig. 3). A packing ring 44, such as a conventional O-ring, is disposed in sealing engagement between body 15 and the adjacent end of sleeve valve 40. A metal collar 45 having a plurality of flexible spring fingers 46 surrounds the upper end of sleeve valve 40 and extends toward the opposite end of the sleeve valve, the fingers serving as stiffening elements for the valve and normally tending to urge the valve inwardly toward body 15. A plurality of angularly spaced openings 47, preferably in the form of elongated slots, as illustrated, are cut through the wall of housing 19 opposite the portion of sleeve valve 40 which passes over tapered portion 39a of boss 39. Openings 47 are adapted to provide communication between the exterior of the valve housing and valve chamber 19a, being the inlet ports to valve chamber 19a.

A tubular check valve, indicated at 48, is mounted in chamber 19a and surrounds a portion of body 15 between ports 18 and sleeve valve 40. Check valve 48 comprises a tubular body portion 49 composed of flexible resilient material, such as rubber and the like, and has an upwardly and outwardly flaring flexible lip portion 50, the outer end of which is normally in sealing engagement with the inner wall of housing 19. The lower end of body portion 49 is clamped to body 15 by means of an annular fitting 51 similar to fitting 42 and is similarly locked to body 15, as by means of a tangential locking pin 52. A packing ring 53, such as a conventional O-ring, is disposed in sealing engagement between body 15 and body portion 49 of the check valve. A plurality of angularly spaced ports 54 are provided circumferentially in body 15 opposite the interior of check valve 48.

The above-described valve is operated in the following manner: Before being installed in a tubing string, chamber 32 is charged with a pneumatic fluid such as air or gas through filler opening 34 to a pre-determined operating pressure. This gas under pressure will flow through passageway 30 into the space between sleeve valve 40 and body 15. Since the ends of the valve are sealed, as described above, the gas will be trapped beneath sleeve valve 40 and the pressure of the gas will tend to expand the sleeve valve radially and circumferentially toward openings 47. It will be evident that so long as the pressure on the exterior of sleeve valve 40 is less than the pre-determined pressure of the pneumatic fluid in chamber 32 which is exerted on the inner surface of the valve, the sleeve valve will be maintained in expanded position and will be forced against the wall of housing 19 over openings 47 and form a tight closure therewith. Fingers 46 will flex with the movements of the sleeve valve and will tend to resist the outward movement of the valve. They will also act as reinforcements for the valve material to prevent extrusion thereof through openings 47 under the pressure of the gas in chamber 32. The valve will thus normally be in the closed position (Fig. 2).

The valve, having thus been pre-set to the desired operating pressure by the gas introduced into chamber 32, will then be installed in the string of tubing 55 (Fig. 6) and lowered into a well 56, having a casing 57 of larger diameter than the tubing. As indicated in Fig. 6, and in accordance with conventional practice, a plurality of such valves will normally be installed at longitudinally spaced points along the tubing string. The several valves will normally be set at successively lower operating pressures in descending order along the tubing. The lower end of the tubing may be provided with a screen 58 and the annular space 59 between the tubing and well casing may be sealed off above the screen by means of a conventional packer 60. It will be understood that when the tubing string, having the lift valves installed therein, is inserted in the well, oil or other formation liquid will enter the bottom of the tubing string and will rise in the interior thereof to whatever height it may be forced by the natural pressure existing in the oil producing formation. Where the natural pressure is insufficient to cause the well to flow naturally, a gas-lift system may be employed to inject lifting gas into the liquid column inside the tubing to lift the fluid to the surface and cause the well to flow.

In accordance with conventional practice, gas or air (herein referred to as "gas" generally), in sufficient volume and at suitable pressures, will be introduced at the surface into annular space 59 to operate the several valves for the purpose of injecting the gas into the column of fluid inside the tubing. The manner in which such a series of valves operate generally is well understood in the art. For present purposes the operation of a single valve in accordance with this invention will be described in order to illustrate its mode of operation. While the pressure in annular space 59 is still below the opening pressure of the valves, the column of fluid inside the tubing string and above a particular valve will be prevented from flowing out or back through the gas lift valves, in accordance with the present invention, by means of check valve 48. It will be seen that any fluid inside the tubing string above ports 18 will tend to flow out of the tubing into valve chamber 19a. However, this fluid will flow into the outwardly flared open upper end of the check valve 48 and the hydrostatic pressure of the fluid will expand lip 50 outwardly into sealing engagement with the wall of housing 19 (Fig. 2) thus effectively preventing the backward flow of this fluid. The greater the head of fluid applied to the check valve, the tighter will be the seal thus formed. Any detritus, sand or other sediment contained in the fluid and trapped above check valve 48 will drain back into the interior of the tubing string through ports 54.

As soon as the pressure of the gas in annular space 59 exerted on the area of sleeve valve 40 covering openings 47 exceeds the pre-set pressure on the opposite side of the sleeve valve, as exerted by the loading gas in chamber 32, the sleeve valve will be forced inwardly away from openings 47 and the gas from annular space 59 will flow through openings 47 into valve chamber 19a and will flow upwardly therein past the outside of check valve 48 and thence through ports 18 into the interior of body 15 and into the column of fluid standing inside the tubing string. The force and volume of gas thus introduced will blast or lift the column of fluid standing above the valve to the surface and expel it from the tubing. The fully open position of the valve is shown in Fig. 1. As soon as the pressure of the gas in the annular space falls below the pre-set closing pressure on the sleeve valve the latter will close and check valve 48 will prevent any back flow of fluid from the tubing, the ports of the valve again assuming the positions shown in Fig. 2.

As will be seen from the foregoing, when sleeve valve 40 opens, an annular orifice for admission of the injection gas is formed which has an area equal to the area of the annular space between the exterior of sleeve valve 40 and the inner wall of housing 19. In the present valve this area will be from 10 to 20 times as great as the port area which it is possible to obtain with conventional valves of the same nominal size, thereby providing greatly improved operating efficiency.

By way of contrast, a valve in accordance with the present invention, adapted for installation in standard tubing having a standard nominal two-inch diameter, will have a gas admission orifice area in fully open position of approximately 1.3 square inches whereas, standard conventional valves for the same installation will have orifice areas in fully open position of from approximately 0.07 square inch to about 0.13 square inch.

By selection of an appropriate volume for chamber 32, the change in volume resulting from the flexing of sleeve valve 40, is practically negligible.

Accordingly, the present valve opens and closes substantially instantaneously as the pressure, respectively exceeds or falls below the pre-set pressure of the valve so that there will be minimum wastage of lifting gas. Also, since the valve closure is constructed of resilient composition material, such as rubber, it will be substantially unaffected by the erosive or corrosive action of the stream of gas and the valve will be substantially free from mechanical friction in its operation. The concentric construction of the valve in accordance with the present invention, permits the insertion into the annular space of various types of fishing tools, such as "over-shots," wash-over pipes and the like, when necessary in connection with fishing operations conducted while the tubing is in the well. The described concentric construction also permits the tubing string, with the valves in place, to be withdrawn through conventional pipe wipers, a condition which is not readily possible with more conventional valves, because of their off-set or eccentric mounting on the tubing.

Figs. 7, 8 and 9 illustrate another embodiment in accordance with this invention. In this embodiment, there is a tubular body 60 which has an extension 61 connected to its lower end by a threaded collar 62. The outer ends of body 60 and extension 61 are adapted, as in the earlier embodiment, to be connected into a string of tubing. Body 60 is concentrically surrounded by a larger diameter tubular housing comprising an upper section 63 which is screwed into a lower section 64. The outer ends of housing sections 63 and 64 are closed about the exteriors of body 60 and extension 61, respectively. Surrounding an intermediate portion of body 60 and co-axially disposed within the annular space between body 60 and housing section 64 is an elongated sleeve member, designated generally by the numeral 66. Sleeve member 66 is composed of a medial ring portion 67, the inner wall of which fits snugly about the adjacent surface of body 60, and a pair of oppositely extending, outwardly flaring end portions 68 and 69, respectively. Each of the end portions 68 and 69 are provided with a plurality of angularly spaced elongated slots 70 (see particularly Fig. 9) whereby the end portions form grids extending from opposite ends of ring portion 67. The latter is provided on its outer surface with a circular rounded boss 71 which extends slightly toward housing section 64. A tubular sleeve valve 72, constructed of flexible resilient material, such as rubber or the like, and of lesser wall thickness than the width of the annular space between body 60 and housing section 64, surrounds sleeve 66 and has its outer surface normally fitted snugly against the inner wall of housing section 64. The ends of sleeve valve 72 are molded over the ends of sleeve 66 and are seated in longitudinally spaced upper and lower end rings 73 and 74, respectively, which are disposed about body 60 in the annular space between the latter and housing section 64. The outer surface of upper end ring 73 is dimensioned to form a snug fit with the inner wall of housing section 64 and a packing ring 75 is disposed between the adjacent surfaces of housing section 64 and end ring 73 to form a fluid-tight seal therebetween. The inner diameter of end ring 73 is made slightly greater than the external diameter of the adjacent portion of body 60 to form an annular passageway 76 providing communication between the annular space above end ring 73 and the interior of sleeve 66. Lower end ring 74 has its inner diameter dimensioned to fit snugly about the adjacent portion of body 60 and packing rings 77 are disposed between these surfaces to form a fluid-tight seal therebetween. The lower end of end ring 74 rests on the upper end of collar 62, which serves to hold this ring and the elements connected thereto in place. A plurality of angularly spaced half-round tubes 78 are arranged between the outer surfaces of end ring 74 and sleeve valve 72 and the adjacent wall of housing section 64 and extend upwardly from the lower end ring to points approximately opposite boss 71. These tubes 78 form passageways providing means for admitting pressure fluid from the annular chamber 79 below end ring 74, between the outer face of sleeve valve 72 and the adjacent surface of housing section 64. Packing rings 80 are provided between the inner surface of ring portion 67 and the adjacent surface of body 60 to form a fluid-tight seal therebetween. A filler opening 81, fitted with an inwardly opening check valve 82, is provided in the lower end of chamber 79 for introduction of gas thereto. A plurality of ports 83 are provided in the portion of the wall of body 60 below ring portion 67 and opposite end portion 69 of sleeve member 66, and form the outlet ports from the valve chamber for introducing lifting gas into the interior of the tubing string in which the valve structure is installed.

A series of angularly spaced inlet ports 84 are provided in the wall of upper housing section 63 near its upper end to provide passages for admitting lifting gas from the exterior of the valve housing to the annular space between the housing and body 60. A sleeve-type, sliding check valve, designated generally by the numeral 85, is mounted in the annular space between housing section 63 and body 60 and intermediate the upper end of end ring 73 and ports 84. Check valve 85 comprises a tubular body 86, constructed of metal, having its external diameter dimensioned to provide a snug sliding fit with the inner wall of housing section 63. Its inner diameter is made somewhat greater than the outer diameter of the adjacent portion of body 60 to provide an annular passageway 87 through which fluid may flow between passageway 76 and ports 84 when check valve 85 is in the open position, as illustrated in Fig. 7. At its lower end check valve body 86 has an outwardly extending flange 88 which has a snugly sliding fit in an enlarged portion 89 of the bore of housing section 63. The upper end of enlarged bore 89 forms a downwardly facing shoulder 90 adapted to engage flange 88 to limit the extent of its movement in the upward direction. The length of check valve body 86 is dimensioned so that when the check valve is in its extreme upper position (Fig. 8) the upper end of body 86 will extend into the portion of the annular space between housing section 63 and the upper portion of body 60 just below the level of ports 84. This portion of body 60 is outwardly thickened at 91 so that the adjacent annular space will be reduced to a width such that the upper end of check valve body 86 will fit snugly therein. A sealing ring 92 is disposed in the exterior of the thickened portion 91 to form a fluid-tight seal with the inner surface of check valve body 86 when the latter slides over this surface. Another sealing ring 93 is interposed between flange 88 and the adjacent wall of enlarged bore 89 to provide a fluid-tight seal about the exterior of check valve 85.

The last described embodiment operates in the following manner: Chamber 79 will be charged with gas to the desired operating pressure. This gas will flow through tubes 78 and apply its pressure to the exterior of sleeve valve 72. Since this gas is trapped against escape by reason of sealing ring 75 at the opposite end of the sleeve valve the pressure of the gas will expand sleeve valve 72 inwardly into sealing engagement with boss 71 closing the valve against passage of fluid therethrough. The closed position of the valve is illustrated in Fig. 8. When the pressure of the lifting gas outside the valve housing exceeds the pre-set pressure on sleeve valve 72 by the gas in chamber 79, the lifting gas will flow through ports 84 into the valve housing. The movement of the gas will force check valve 85 downwardly, allowing the entering gas to flow through passageways 87 and 76 into the interior of upper end portion 68 of sleeve member 66, whence the gas will flow outwardly through slots 70 and apply its pressure against the inner surface of sleeve valve 72. The pressure of the entering gas being greater than that from chamber 79, sleeve valve 72 will be forced outwardly and away from boss 71, opening the valve and permitting the lifting gas to flow inwardly through slots 70 into the lower end portion 67 of sleeve member 66 and thence through ports 83 into the interior of body 60 and into the column of well fluid standing in the tubing string. As the incoming gas is exhausted in raising the fluid in the tubing, its pressure will drop below the closing pressure of the valve which will then close against boss 71 cutting off further flow of gas into the tubing. Any fluid tending to flow back from the tubing through ports 84 to the exterior of the valve housing will cause check valve 85 to move upwardly to the closed position shown in Fig. 8.

In this embodiment, as in that previously described, it will be noted that, in the open position, the orifice area of the valve is the area of the annular space between boss 71 and the inner face of sleeve valve 72, a relatively large area as compared with conventional valves.

Figs. 10 and 11 illustrate still another embodiment of the valve structure in accordance with this invention. In this embodiment there is a tubular body 95 having an extension 96 connected thereto by means of a threaded collar 97. Body 95 and extension 96 are concentrically surrounded by a tubular housing composed of an upper housing section 98 and a lower housing section 99, the adjacent ends of which extend about collar 97 and are fixed thereto. The outer ends of the housing section are closed about the respective body portions. The portion of the annular space above collar 97 is the valve chamber 100. The annular space below collar 97 between extension 96 and lower housing section 99 defines a pressure chamber 101 and an opening 102, fitted with an inwardly opening check valve 103, is provided in the wall thereof for introduction of pressurizing gas into chamber 101. A tubular sleeve valve 104, constructed of resilient material, such as rubber and the like, is mounted on the exterior of body 95 and is normally radially spaced from the inner wall of housing section 98. The lower end of sleeve valve 104 is clamped to body 95 by the upper end of collar 97 and the upper end of sleeve valve 103 is clamped to body 95 by means of a clamping ring 105. The ends of sleeve valve 104 are thus held against longitudinal movement along body 95 and form longitudinally spaced fluid-tight seals about the outer surface of the body and the inner wall of the housing. The medial portion of sleeve valve 104 is hollowed out on its inner side to form an expansion chamber 106. A longitudinal passageway 107 is provided in the wall of body 95 which communicates at one end with expansion chamber 106 and at the other end with a passageway 108 which is bored longitudinally through collar 97 and communicates with chamber 101. A plurality of angularly spaced outlet ports 109 are provided in the wall of body 95 communicating with the upper end portion of valve chamber 100. A plurality of angularly spaced inlet ports 110 are provided in the wall of housing section 98 at a level generally opposite the lower end of sleeve valve 104 and below expansion chamber 106. A check valve 111, substantially identical in form and function with check valve 48 of the embodiment first described above, is mounted on body 95 above clamping ring 105 and below ports 109. A series of drain ports 112 are provided in the wall of body 95 providing communication between the bore of body 95 and the inside of check valve 111, as shown.

This embodiment operates in substantially the same manner as the first described embodiment. Chamber 101 will be charged with gas to the desired operating pressure and flows through passageways 108 and 107 into expansion chamber 106 where the pressure will be exerted against the inside of sleeve valve 104 to normally expand the latter radially into sealing contact with the opposite portion of the inner wall of housing section 98, to thereby close valve chamber 100 against movement of fluid between ports 110 and 109. This is the normally closed position of the valve illustrated particularly in Fig. 11. Check valve 111 will be in the expanded position illustrated in Fig. 11 to prevent back flow of fluid from the interior of the body through the valve chamber. When the gas pressure outside housing 98 exceeds the pre-set pressure in chamber 101, the gas will enter ports 110 and force the distended portion of sleeve valve inwardly toward body 95 thereby opening the valve and allowing the gas to flow through valve chamber 100, past check valve 111 to ports 109 and thence into the column of fluid inside the tubing string to which body 95 and extension 96 are connected. The fully open position of the valve is illustrated in Fig. 10.

As in the previously described embodiment, an annular orifice area of relatively large diameter will be provided between sleeve valve 104 and housing section 98 for admission of injection gas.

Fig. 12 illustrates a modified form of check valve which may be employed in place of those incorporated in the valve structures previously described. In this modification, the check valve, designated generally by the numeral 48a, is mounted in a recessed portion 115 in the inner wall of body 15a opposite outlet ports 18a leading from valve chamber 19b into the bore of body 15a. Check valve 48a has a generally annular, upwardly and outwardly flaring shape and is constructed of flexible resilient material, such as rubber or the like. Check valve 48a is clamped to the recessed portion of body 15a by means of a metal sleeve 116 which is inserted in the bore of the check valve and having its lower end suitably fastened to the inner wall of recessed portion 115 below the lower end of check valve 48a, whereby to clamp the lower portion of the check valve tightly against body 15a leaving the upper end of the check valve free to flex. Sleeve 116 has an inner diameter substantially flush with the bore of body 15a, and its upper portion is provided with a plurality of perforations 117.

With this arrangement it will be seen that gas flowing through ports 18a from valve chamber 19b into the bore of body 15a will be directed by check valve 48a upwardly about the inner wall of body 15a producing an annular jetting action which will be helpful in lifting the column of fluid in the bore of body 15a. When the pressure of the entering gas is reduced below the hydrostatic head of the fluid column in the bore of body 15a, the pressure of the fluid column will compress check valve 48a against the inner ends of ports 18a and thereby prevent return flow of this fluid through ports 18a. The closed position of the check valve is illustrated in Fig. 12. Perforations 117 serve to drain the space between sleeve 116 and check valve 48a. It will be understood that in all other respects the operation of the lift valve structures previously described will be unchanged.

As will be seen from the foregoing, all of the embodiments possess the same primary structural and operative features, that is, the concentric construction relative to the tubing string; annular gas passage of relatively large area; non-metallic valve closure, etc.

It will be understood that numerous variations and modifications may be made in the details of the illustrative embodiments within the spirit of this invention without departing from the scope of the appended claims.

What I claim and desire to secure by Letters Patent is:

1. A gas lift valve, comprising, a tubular body adapted for co-axial insertion in a pipe string, an annular valve chamber concentrically surrounding said body and having longitudinally spaced inlet and outlet ports communicating respectively with the exterior of said chamber and the interior of said body, a tubular valve member constructed of flexible resilient material co-axially mounted in said valve chamber, said valve member being annularly expansible and contractible to control the passage of fluid through said chamber between said ports, and means for maintaining a pre-determined pneumatic pressure on the side of said valve member adapted to normally urge same to an expanded valve-closing position.

2. A gas lift valve, comprising, a tubular body adapted for co-axial insertion in a pipe string, an annular valve chamber concentrically surrounding said body and having longitudinally spaced inlet and outlet ports communicating respectively with the exterior of said chamber and the interior of said body, a tubular valve member constructed of flexible resilient material co-axially mounted in said valve chamber, said valve member being annularly expansible and contractible to control the passage of fluid through said chamber between said ports, a second annular chamber concentrically mounted about said body and having pneumatic pressure fluid confined therein at a pre-determined pressure, and a passageway communicating with said second chamber and adapted to direct said pressure fluid against one side of said valve member, whereby to normally urge said valve member to an expanded valve-closing position.

3. A gas lift valve, comprising, a tubular body adapted for co-axial insertion in a pipe string, an annular valve chamber concentrically surrounding said body and having longitudinally spaced inlet and outlet ports communicating respectively with the exterior of said chamber and the interior of said body, a tubular valve member constructed of flexible resilient material co-axially mounted in said valve chamber, said valve member being annularly expansible and contractible to control the passage of fluid through said chamber between said ports, means for maintaining a pre-determined pneumatic pressure on the side of said valve member adapted to normally urge same to an expanded valve-closing position, and tubular check valve means annularly disposed in said valve chamber intermediate said ports adapted to prevent return flow of said fluid from said outlet ports to said inlet ports.

4. A gas lift valve, comprising, a tubular body adapted for co-axial insertion in a pipe string, a tubular housing concentrically surrounding said body and having its opposite ends closed to define an annular space about said body, partition means arranged in said annular space intermediate the ends thereof to divide said space into first and second annular chambers, said first chamber having longitudinally spaced inlet and outlet port means communicating respectively with the exterior of said housing and the interior of said body, a tubular valve member co-axially disposed in said first chamber, said valve member being constructed of flexible resilient material and having a wall thickness less than the width of said annular space, said valve member being annularly expansible and contractible to control the passage of fluid through said first chamber between said port means, one end of said valve member being sealed about said body at a point intermediate said port means, and the other end of said valve member being sealed about the inner wall of said housing at a point axially outwardly relative to said inlet port means, and a passageway extending through said partition means connecting said second chamber to a point in said first chamber on one side of said valve member intermediate the ends thereof, said second chamber containing pneumatic pressure fluid at a pre-determined pressure.

5. A gas lift valve according to claim 4, having a tubular check valve means annularly disposed in said first chamber intermediate said valve member and said outlet port means and adapted to prevent return flow of said fluid from said outlet port means to said inlet port means.

6. A gas lift valve according to claim 4 having a tubular check valve means annularly disposed in said first chamber intermediate said valve member and said outlet port means, said check valve means comprising an upwardly opening cup-shaped member mounted on said body and having an outwardly flaring flexible, resilient lip at its upper end normally engageable with the inner wall of said housing.

7. A gas lift valve according to claim 4, having a tubular inwardly opening check valve means annularly disposed in the bore of said body controlling said outlet ports.

LESLIE L. CUMMINGS.

No references cited.